US010619738B2

(12) United States Patent
Gollmer et al.

(10) Patent No.: US 10,619,738 B2
(45) Date of Patent: Apr. 14, 2020

(54) PARKING BRAKE SYSTEM

(71) Applicant: Bayerische Motoren Werke Aktiengesellschaft, Munich (DE)

(72) Inventors: Roland Gollmer, Diessen (DE); Sebastian Liebert, Unterfoehring (DE); Andreas Hoppe, Munich (DE)

(73) Assignee: Bayerische Motoren Werke Aktiengesellschaft, Munich (DE)

(*) Notice: Subject to any disclaimer, the term of this patent is extended or adjusted under 35 U.S.C. 154(b) by 119 days.

(21) Appl. No.: 15/840,743

(22) Filed: Dec. 13, 2017

(65) Prior Publication Data

US 2018/0119816 A1 May 3, 2018

Related U.S. Application Data

(63) Continuation of application No. PCT/EP2016/066273, filed on Jul. 8, 2016.

(30) Foreign Application Priority Data

Jul. 24, 2015 (DE) .................. 10 2015 214 037

(51) Int. Cl.
*F16H 63/34* (2006.01)
*F16H 63/48* (2006.01)
*F16H 61/02* (2006.01)

(52) U.S. Cl.
CPC ..... *F16H 63/3483* (2013.01); *F16H 61/0206* (2013.01); *F16H 63/48* (2013.01);
(Continued)

(58) Field of Classification Search
CPC .. F16H 63/34–38; F16H 63/48; F16H 63/483; F16H 61/0267; F16H 61/0269; F16H 61/0206
See application file for complete search history.

(56) References Cited

U.S. PATENT DOCUMENTS 8,667,859 B2 * 3/2014 Engel .................. F16H 61/30
74/473.11
8,944,232 B2 * 2/2015 Schmidt ............... F15B 15/26
192/219.4
(Continued)

FOREIGN PATENT DOCUMENTS

AT 004 094 U1 1/2001
CN 1363481 A 8/2002
(Continued)

OTHER PUBLICATIONS

Chinese-language Office Action issued in counterpart Chinese Application No. 201680028577.0 dated Oct. 8, 2018 with English translation (12 pages).
(Continued)

*Primary Examiner* — David R Morris
*Assistant Examiner* — James J Taylor, II
(74) *Attorney, Agent, or Firm* — Crowell & Moring LLP

(57) ABSTRACT

A parking brake system for a motor vehicle transmission is provided. The parking, brake system includes a brake cylinder having a brake piston movable between braking and locking positions, a piston lock provided to lock the brake piston in the locking position, a piston valve configured to activate the brake cylinder using a fluid, and a locking valve configured to activate the piston lock using a fluid. The piston valve can be connected, in a fluid-conducting manner on the downstream side facing away from the brake cylinder, to a supply pressure system, and the locking valve, on the side facing away from and downstream of the piston lock, can be connected in a fluid-conducting manner to the supply pressure system, such that the locking valve is arranged downstream of and parallel to the piston valve relative to the supply pressure system.

14 Claims, 3 Drawing Sheets

(52) U.S. Cl.
CPC ........ *F16H 63/3433* (2013.01); *F16H 63/483* (2013.01); *F16H 2312/02* (2013.01); *F16H 2312/12* (2013.01)

(56) References Cited

U.S. PATENT DOCUMENTS

| | | | |
|---|---|---|---|
| 9,261,188 B2* | 2/2016 | Ruehle | F16H 63/3416 |
| 9,624,990 B2* | 4/2017 | Ruehle | F16H 61/688 |
| 2002/0083986 A1 | 7/2002 | Park et al. | |
| 2007/0284213 A1 | 12/2007 | Duhaime et al. | |
| 2012/0160631 A1 | 6/2012 | Bauer et al. | |
| 2014/0110216 A1 | 4/2014 | Pollack | |
| 2014/0360302 A1* | 12/2014 | Lundberg | F16H 61/0021 74/473.11 |

FOREIGN PATENT DOCUMENTS

| | | |
|---|---|---|
| CN | 201712596 U | 1/2011 |
| CN | 201723694 U | 1/2011 |
| CN | 102678917 A | 9/2012 |
| DE | 103 37 582 A1 | 3/2005 |
| DE | 10 2007 026 599 A | 1/2008 |
| DE | 10 2009 035 348 A1 | 2/2011 |
| DE | 10 2011 105 068 A1 | 7/2012 |
| WO | WO 2005/019704 A1 | 3/2005 |
| WO | WO-2016087018 A2 * | 6/2016 ......... F16H 63/3483 |

OTHER PUBLICATIONS

Cover page of EP 1 654 482 A1 published May 10, 2006 (One (1) page).
German Search Report issued in counterpart German Application No. 10 2015 214 037.7 dated Apr. 18, 2016 with partial English-language translation (fifteen (15) pages).
International Search Report (PCT/ISA/210) issued in PCT Application No. PCT/EP2016/066273 dated Nov. 23, 2016 with English-language translation (seven (7) pages).
Japanese-language Written Opinion (PCT/ISA/237) issued in PCT Application No. PCT/EP2016/066273 dated Nov. 23, 2016 (twelve (12) pages).

* cited by examiner

PARKING BRAKE SYSTEM

CROSS REFERENCE TO RELATED APPLICATIONS

This application is a continuation of PCT International Application No. PCT/EP2016/066273, filed Jul. 8, 2016, which claims priority under 35 U.S.C. § 119 from German Patent Application No. 10 2015 214 037.7, filed Jul. 14, 2015, the entire disclosures of which are herein expressly incorporated by reference.

BACKGROUND AND SUMMARY OF THE INVENTION

The present invention relates to a parking brake system having a brake cylinder and brake piston. A parking brake system of this type is known from the general prior art and, in particular, from DE 10 2011 105 068 A1. Furthermore, the invention relates to a transmission having a parking brake system of this type, and to a motor vehicle having a transmission of this type.

In the following text, the invention will be described in conjunction with what is known as a parking lock for a passenger motor vehicle automatic transmission; this is not to be understood to be a restriction of the invention to an application of this type.

Motor vehicles having an automatic transmission are usually equipped with what is known as a parking lock mechanism, in order to prevent the vehicle from rolling away at a standstill of the vehicle or in the case of a switched-off engine. Depending on the transmission design, the actuation of the parking lock can take place manually via a selector lever or hydraulically by a parking lock actuator. Said parking lock actuator can be a brake cylinder with a brake piston, it being possible for the brake cylinder to lock/block a transmission output via the brake piston, in particular in a positively locking manner, and rolling away of the vehicle therefore being prevented.

DE 10 2011 105 068 A1 has disclosed that the hydraulic brake piston can be fixed in a defined position by way of a locking apparatus. Said fixing action can be canceled by way of an electromechanical actuator or by way of a hydraulic or pneumatic actuator, as a result of which the brake piston can be moved.

It is an object of the invention to specify a parking brake system with improved operational reliability.

A parking brake system according to the invention has a brake cylinder with a brake piston. Furthermore, the brake cylinder is preferably configured as a single-acting hydraulic cylinder and preferably has a piston spring which is set up to move the brake piston in one direction. The piston spring further preferably acts on the brake piston in such a way that the latter is pressed into a braking position (blocked transmission), and a failsafe system can thus be achieved, in particular. The brake piston is mounted in the brake cylinder such that it can be moved between a braking position, in which at least one transmission output shaft is blocked, and a locking or releasing position, in which the transmission output shaft can be rotated.

The parking brake system has a piston lock for fixing the brake piston in at least one position, in particular in the locking or releasing position.

Locking or fixing of the brake piston is to be understood to mean, in particular, that the brake piston is prevented from leaving said position by way of the piston lock in a positively locking or frictionally locking manner. Said piston lock can preferably be connected in a fluid-conducting manner to a locking valve.

The brake cylinder can further preferably be connected in a fluid-conducting manner to a brake valve.

The locking valve is set up to actuate the piston lock by way of a hydraulic fluid, that is to say to load it by way of a hydraulic pressure and, as a result, to transfer it from an operating state, in which the brake piston is locked, into an operating state, in which the brake piston is not locked and can therefore be moved, or vice versa. The piston lock further preferably has at least one (preferably single-acting) hydraulic cylinder.

The piston valve preferably has a valve connector on the side which faces away downstream from the brake piston, which valve connector can be connected in a fluid-conducting manner to a supply pressure system. Here, in the context of this invention, downstream is to be understood to mean the flow direction from the piston valve toward the brake cylinder or from the locking valve toward the piston lock.

According to the invention, the locking valve has a valve connector on the side which faces away downstream of the piston lock, which valve connector can be connected in a fluid-conducting manner to said supply pressure system. The result of said arrangement of the valve connectors on the locking valve and on the piston valve is that the two valves are arranged downstream parallel to one another. The locking valve can therefore be connected in a fluid-conducting manner directly to the supply pressure system. Here, in this context, "can be connected directly" is to be understood to mean, in particular, that the pressure from the supply pressure system is not fed via the piston valve to the locking valve.

In particular, the parallel nature of the two valves makes it possible to actuate said two valves autonomously from one another and therefore to increase the operational reliability of the parking brake system.

In one preferred embodiment, the piston valve is configured as a directional valve. A directional valve of this type has at least three valve connectors and at least two control positions. The piston valve is preferably configured as a 3/2-way valve, and preferably as a 4/2-way valve with four valve connectors and two control positions. Here, control positions are to be understood to mean positions of an internal valve slide, by way of which positions the valve connectors which are arranged downstream on different sides of the directional valve can be connected to one another in a selective manner. Directional valves of this type are known from the prior art, in particular as longitudinal slide valves or rotary slide valves.

The locking valve is further preferably also configured as a directional valve which has at least three valve connectors and at least two control positions.

The piston valve which is configured as a 3/2-way valve further preferably has a valve connector downstream on the side which faces the brake cylinder, and two valve connectors on the downstream opposite side of the piston valve. One of said two valve connectors can be connected in a fluid-conducting manner to the supply pressure system, and the further of the two valve connectors can be connected in a fluid-conducting manner to a hydraulic reservoir, in particular a hydraulic oil tank or the transmission oil sump.

The piston valve which is configured as a 4/2-way valve further preferably has two valve connectors downstream on the side which faces the brake cylinder, and two further valve connectors on the downstream opposite side of the piston valve. A piston valve of this type is preferably used for a double-acting brake cylinder, it preferably being possible for the two valve connectors on that side of the piston valve which faces the brake cylinder downstream to be connected to separate connectors of the brake cylinder. The valve connectors of the piston valve which face the supply pressure system downstream are further preferably connected as in the case of the 3/2-way valve.

The supply pressure system is preferably to be understood to mean a hydraulic circuit for supplying the parking brake system with a hydraulic fluid, preferably with hydraulic oil and with preference with transmission oil.

The locking valve is preferably configured as a directional valve, and the locking valve is preferably configured as a directional valve and has at least two control positions and three valve connectors. Two of said three valve connectors are preferably arranged on that side of the locking valve which faces the supply pressure system downstream. The third valve connector is further preferably arranged on the downstream opposite side of the locking valve.

The locking valve or the piston valve or both valves preferably has/have at least one control pressure connector. Within the context of the invention, a control pressure connector is to be understood to mean a connector on one of the valves, via which connector said valve can be loaded with a pressurized hydraulic medium at a control pressure, with the result that, in particular, the control position of the valve can be changed or influenced. Here, said control pressure is provided, in particular, to transfer the valve from the one of its control positions into the other or to secure said valve in the control position which has already been assumed.

At least one of the two valves (locking valve, piston valve) further preferably has two or more control pressure connectors. Each of said two valves further preferably has in each case two control pressure connectors. A particularly simple type of controlling the parking brake system is made possible, and therefore its operational reliability can be increased, in particular by way of the loading of the locking valve and/or the piston valve by way of at least one control pressure.

In one preferred embodiment, a shut-off valve, preferably a check valve, with preference a threshold value valve, is arranged downstream between the locking valve and the piston lock. Here, said shut-off valve is provided to prevent the throughflow from the piston lock in the direction of the locking valve. The throughflow through said shut-off valve in the opposite direction is preferably made possible only when the pressure of the hydraulic fluid which is situated between the locking valve and the shut-off valve exceeds a predefined locking threshold value. Said locking threshold value can further preferably be preset or defined.

A tank return line with a throttling valve is further preferably provided downstream of the check valve or threshold value valve and upstream of the piston lock, via which tank return line hydraulic fluid can be discharged into the hydraulic reservoir. The locking threshold value can further preferably be set or predefined via said throttling valve. In particular, a shut-off valve of this type with a locking threshold value makes it possible to prevent the piston lock from being canceled due to faulty control of the locking valve.

A tank return line with a throttling valve is further preferably provided downstream of the check valve or threshold value valve and upstream of the piston lock, via which tank return line hydraulic fluid can be discharged into the hydraulic reservoir. A maximum actuating pressure for the piston lock can further preferably be set via said throttling valve.

In one preferred embodiment, at least one of the control connectors of the piston valve can be connected in a fluid-conducting manner to at least one of the control connectors of the locking valve. Pressure differences in the control connectors can be equalized by way of a connection of this type, and tests have shown that the operational reliability of the parking brake system can therefore be increased.

In one preferred embodiment, the motor vehicle transmission has at least one start-up element which has a start-up pressure connector. Via said start-up pressure connector, the start-up element can be loaded with a start-up pressure and can thus be transferred from an operating state, in which no torque is transmitted by the start-up element, into an operating state, in which a torque can be transmitted, or vice versa. A start-up element of this type is preferably to be understood to mean a clutch or a torque converter which is arranged in relation to the transmission of power between an internal combustion engine and a transmission, in which the parking brake system is preferably arranged. The start-up element is further preferably also to be understood to mean a converter lock-up clutch.

In one preferred embodiment, the motor vehicle transmission has at least one shifting device or one shifting element which is set up to bring about a gear change in the motor vehicle transmission, that is to say, in particular, a gear shift from the n-th gear into the n+1-th gear or vice versa. To this end, the shifting device can further preferably be loaded with a shifting pressure via a shifting pressure connector. Different shifting devices can further preferably be loaded with different shifting pressures. At least one of the control connectors of the locking valve or the piston valve can preferably be connected in a fluid-conducting manner to the shifting pressure connector. A shifting element of this type or a shifting device of this type is further preferably to be understood to mean a clutch, a synchronizer or a brake, as are usually used in automatic transmissions or automated transmissions for selectively establishing a torque-connecting connection during the gear change.

In one preferred embodiment, the locking valve can be loaded by way of a prestress spring. Here, the prestress spring is preferably brought about by way of a valve spring device and causes a spring actuating force on the valve. In particular, the locking valve can be moved into a first control position by way of said spring actuating force. Said spring actuating force further preferably acts at least on the locking valve or on a valve slide in said locking valve in such a way that it is loaded with a force in the direction of the first control position.

The locking valve can preferably be loaded with a control pressure via the control connector which can be connected in a fluid-conducting manner to the start-up pressure connector. Said control pressure brings about a pressure actuating force in the locking valve, which pressure actuating force acts in the same direction as said spring actuating force. At least one component of the pressure actuating force preferably acts in the same direction as the spring actuating force.

The locking valve can further preferably be loaded with a second control pressure via the control connector which can be connected in a fluid-conducting manner to the shifting pressure connector. A second pressure actuating force is brought about in the locking valve by way of said second control pressure, which second pressure actuating force acts in the opposite direction to the spring actuating force. At least one component of the second pressure actuating force preferably acts in the opposite direction to the spring actuating force.

In one preferred embodiment, the piston valve can be loaded by way of a prestress spring, preferably the valve slide which is arranged in the piston valve. A piston spring actuating force is preferably brought about by way of said prestress spring. The piston valve can be moved into a first control position by way of said piston spring actuating force.

In one preferred embodiment, the piston valve can be loaded with a first piston control pressure via the control connector which can be connected in a fluid-conducting manner to the start-up pressure connector. A pressure actuating force can preferably be brought about on the piston valve or on the valve slide of the piston valve by way of said piston control pressure. Said pressure actuating force preferably acts in the opposite direction to the piston spring actuating force.

In one preferred embodiment, the piston valve can be loaded with a second piston control pressure via the control connector which can be connected in a fluid-conducting manner to the shifting pressure connector. A second piston pressure actuating force can preferably be brought about by way of said second piston control pressure. The active direction of the second piston pressure actuating force is further preferably opposed to that of the piston spring actuating force; at least one component of the piston pressure actuating force is preferably opposed to the piston spring actuating force.

The parking brake system according to the invention can be used in an automated manual transmission or in an automatic transmission in such a way that a rotational movement, at least of the transmission output shaft, can be blocked by way of the parking brake system.

Transmissions having known parking brake systems are known; the functional reliability of a transmission of this type can be increased, in particular, by way of the parking brake system according to the invention. A plurality of shifting elements (clutches, brakes) which can be loaded with one hydraulic pressure or with different hydraulic pressures for control purposes are preferably provided in a transmission of this type for changing the gears.

A transmission of this type further preferably has a start-up element, in particular a start-up clutch or a torque converter, in particular with a lock-up clutch. The hydraulic pressures, with which said start-up element and at least one, preferably two or with preference a plurality of said shifting elements can be loaded, are used for controlling preferably the piston valve, with preference the locking valve, and particularly preferably both valves.

A vehicle, in particular a passenger motor vehicle, further preferably has the automated manual transmission or automatic transmission according to the invention.

Other objects, advantages and novel features of the present invention will become apparent from the following detailed description of one or more preferred embodiments when considered in conjunction with the accompanying drawings.

DETAILED DESCRIPTION OF THE DRAWINGS

The embodiments of the invention which are described in the following text differ substantially by way of different types of piston valves and different types of fluid-conducting connections between the piston valve and the locking valve.

Figure 1:
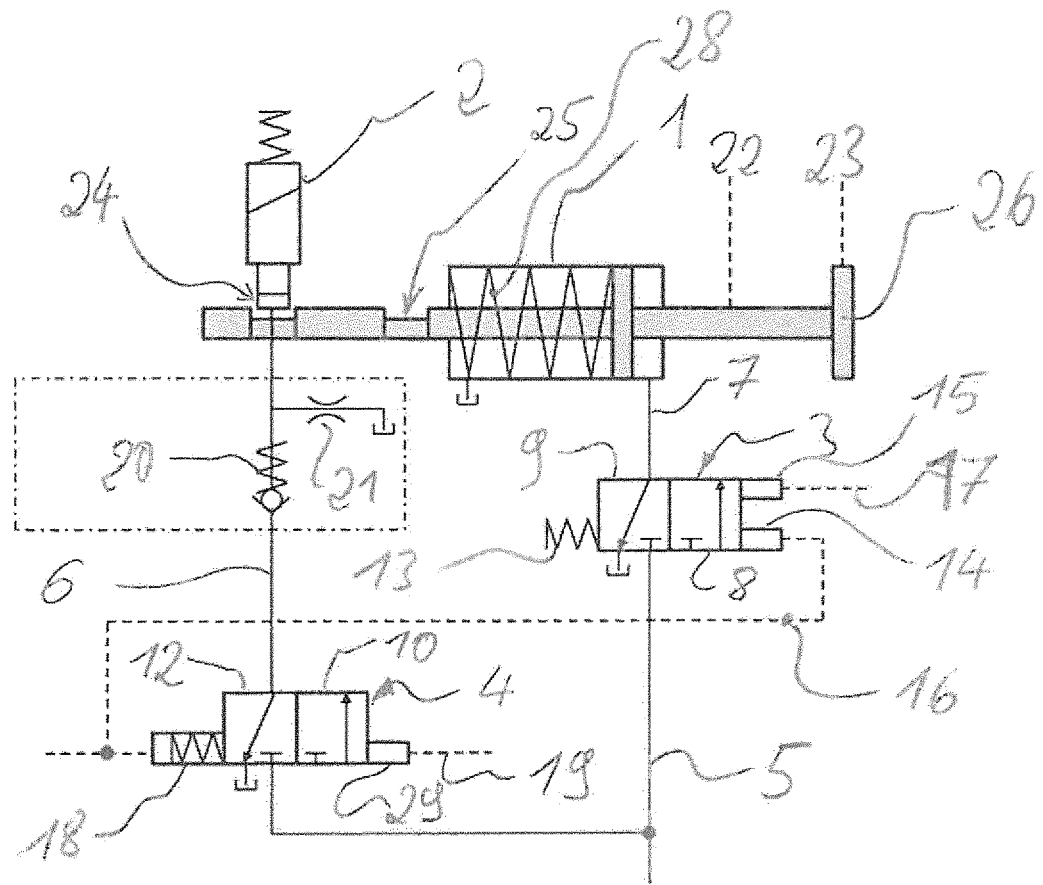
FIG. 1 shows a diagrammatic circuit diagram of a first embodiment of the invention.

FIG. 1 shows a diagrammatic circuit diagram of a first embodiment of the invention. The brake cylinder 1 has a brake piston 26 which can be moved between a parking position 23 and a releasing position 22, as soon as the brake piston 26 is released or unlocked by the locking device 2.

The brake cylinder 1 is configured as a single-acting hydraulic cylinder, and has a brake piston spring 28 which loads the brake piston 26 with a spring force in the direction of the braking position 23. The brake cylinder 1 can be loaded with hydraulic pressure from the pressure supply system 5 via the piston valve 3 which is configured as a 3/2-way valve. The piston valve has two control positions 8, 9. Furthermore, the piston valve 3 has a spring device 13 which pushes in the direction of the first control position 9.

Furthermore, the piston valve 3 has two control pressure connectors 14, 15. Via the first control pressure connector 14, the piston valve 3 can be loaded via the hydraulic line 16 with a pressure from the actuation of the start-up element (not shown). Furthermore, the second control pressure connector 15 can be loaded with a pressure from the actuation of a first shifting element (not shown). The pressure forces which are brought about by the control pressure connectors 14, 15 act counter to the spring force which is brought about by the spring device 13, and push the piston valve 3 into the second control position 8.

If the piston valve is therefore loaded with a sufficient pressure via at least one of the two pressure connectors 14, 15, the second control position 8 of the piston valve 3 is activated, and the pressure supply system 5 is connected in a fluid-conducting manner to the brake cylinder 1 via the hydraulic line 7.

The brake piston 26 has two recesses 24, 25, in order to be locked by way of the locking device 2 in its respective position (braking position 23, releasing position 22). The locking device 2 can be actuated by way of the locking valve 4. The locking valve 4 is configured as a 3/2-way valve. The locking valve 4 has a control pressure connector 29 which can be loaded via the hydraulic line 19 with a pressure from the actuation of a further shifting element. Furthermore, the locking valve 4 also has a control pressure connector on the spring device 18, which control pressure connector is connected to the hydraulic line 16. Here, said control pressure connector of the spring device 18 can be loaded via the hydraulic line 16 with a pressure from the actuation of the start-up element, that is to say with the same pressure as the control pressure connector 14.

A threshold value valve 20 is provided in the hydraulic line 6, for the fluid-conducting connection of the piston valve 4 to the locking device 2. Here, the threshold value valve 20 is inserted into the hydraulic line 6 in such a way that it prevents the return flow of hydraulic fluid from the locking device 2 to the locking valve 4. The pressure can be predetermined in a defined manner via the threshold value valve 20, from which pressure the threshold value valve 20 releases the path for the hydraulic medium in the hydraulic line 6 from the locking valve 4 in the direction of the locking device 2. The throttling valve 21 makes it possible that the hydraulic medium in the hydraulic line 6 between the locking device 2 and the threshold value valve 20 can empty into a hydraulic reservoir. In this way, the repeated engagement of the locking device 2 via the two recesses 24, 25 of the brake piston 26 is simplified.

The locking valve 4 is pushed by way of the spring device 18 into the first control position 12; in said control position 12, the locking device 2 is not loaded with the hydraulic pressure from the pressure supply system 5. If the pressure in the control pressure connector 29 exceeds a threshold value, the locking valve 4 is pushed into its second control position 10, and the pressure supply system 5 is connected in a fluid-conducting manner at least to the threshold value valve 20. If, in addition, the threshold value for opening the threshold value valve 20, which threshold value can be predefined via the throttling valve 21, is exceeded, the positive lock 24 of the brake piston 26 is canceled, and said brake piston 26 is movable and can be moved into the releasing position 22 and can be locked there in the further positive lock 25.

Figure 2:
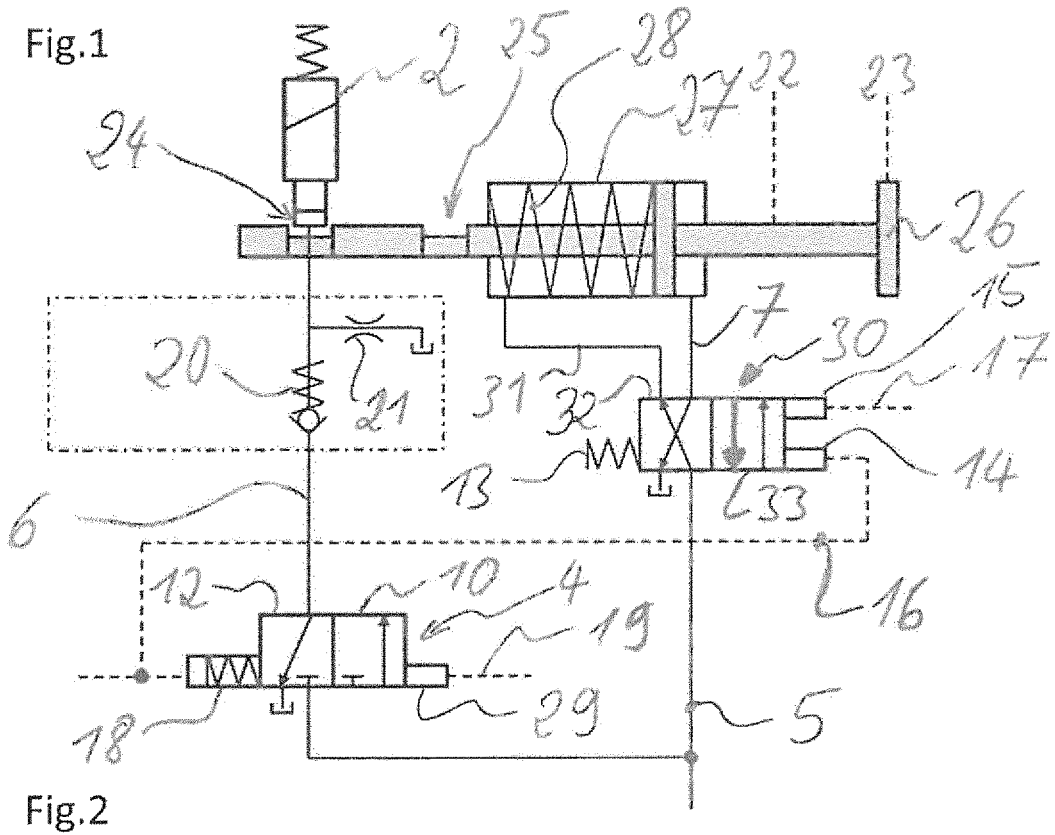
FIG. 2 shows a diagrammatic circuit diagram of a second embodiment of the invention.

A further embodiment of the invention is shown in FIG. 2, said further embodiment being configured as a piston valve as a 4/2-way valve 30, and the brake cylinder being configured as a double-acting hydraulic cylinder 27 with a spring force loading means 28. In the following text, substantially the changes from that embodiment of the invention which is shown in FIG. 1 will be described.

In the first control position 32 of the 4/2-way valve 30, the brake piston 26 is pressed into the braking position 23 both by way of the spring 28 and by way of the hydraulic pressure from the pressure supply system 5, which hydraulic pressure can be fed to the brake cylinder 27 via the hydraulic line 31.

If the 4/2-way valve 30 is moved into its second control position 33 by way of pressure loading of at least one of its control pressure connectors 14, 15, the brake piston 26, in so far as the locking device 2 has released it, is moved into the releasing position 22.

Figure 3:
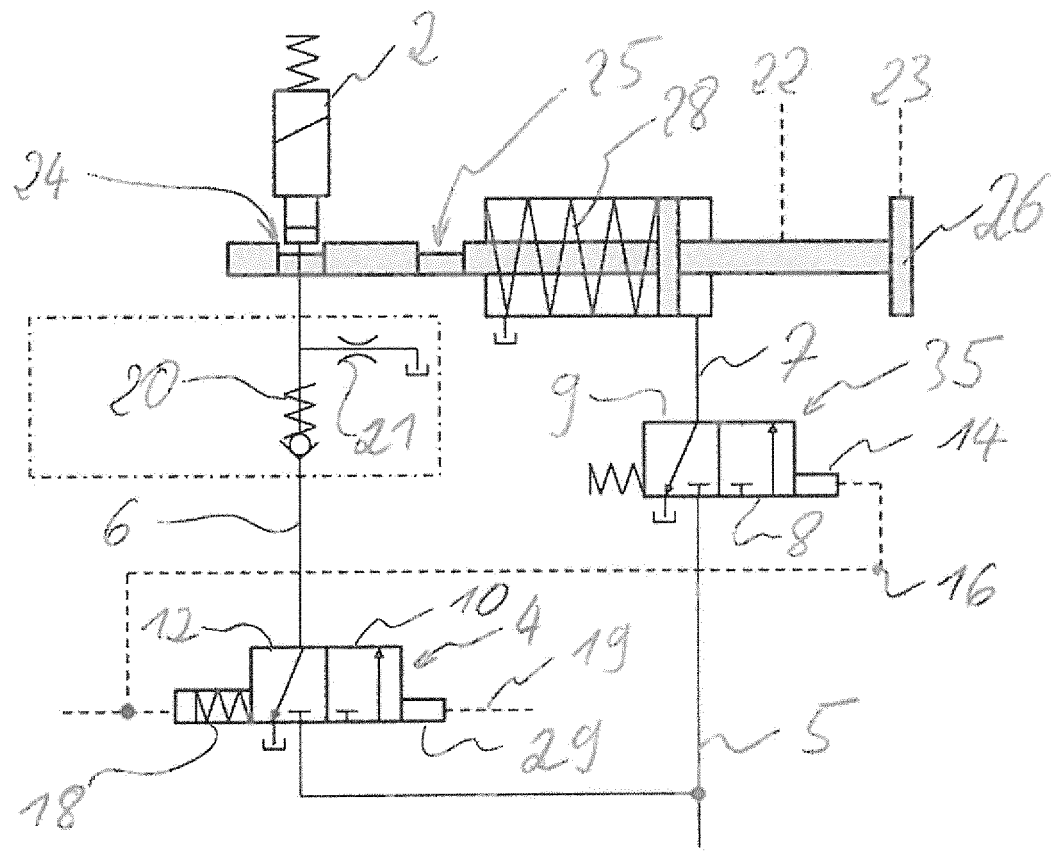
FIG. 3 shows a diagrammatic circuit diagram of a third embodiment of the invention.

FIG. 3 shows a further embodiment of the invention. Therefore, at least substantially the differences from the above-described figures will be described in the following text. The piston valve is configured as a 3/2-way valve 35 with a control pressure connector. In contrast to the embodiment of the invention which is shown in FIG. 1, said piston valve therefore has only the one control pressure connector 14. The control pressure connector 14 can be loaded via the pressure line 16 with the pressure for the actuation of the start-up element (not shown). As in the embodiment which is shown in FIG. 1, the locking valve 4 has two control pressure connectors, of which one is arranged on the spring device 18 and the other of the two (which can be connected to the hydraulic line 19) is arranged directly on the locking valve 4, on the opposite side, with the result that the forces which can be applied via said two control pressure connectors can oppose one another. In comparison with the embodiment which is shown in FIG. 1, only the pressure of one of the shifting elements (not shown) is therefore used for actuating the piston valve or the locking valve.

Figure 4:
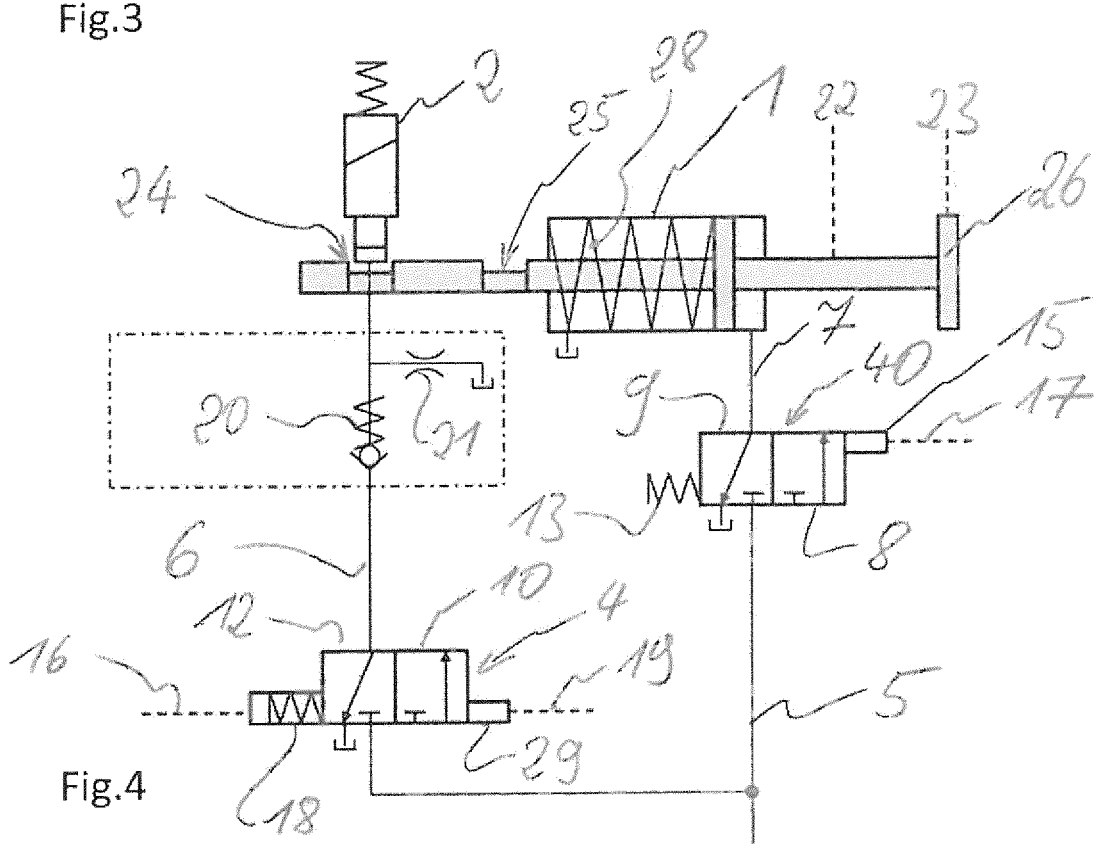
FIG. 4 shows a diagrammatic circuit diagram of a fourth embodiment of the invention.

FIG. 4 shows a further embodiment of the invention as an at least partially diagrammatic circuit diagram. Substantially the differences from the above-described embodiments will be described in the following text.

The piston valve is configured as a 3/2-way valve 40 which has only one control pressure connector 15 which can be loaded via the hydraulic line 17 with pressure from the actuation of a shifting element (not shown).

In an unchanged manner with respect to the embodiment which is described in FIG. 1, the locking valve 4 has two control pressure connectors, of which one (control pressure connector 19) can be loaded with pressure from the actuation of a further shifting element (not shown), and one (control pressure connector 14) can be loaded with pressure from the actuation of the start-up element (not shown), with the result that a particularly simple construction of the system is made possible.

Figure 5:
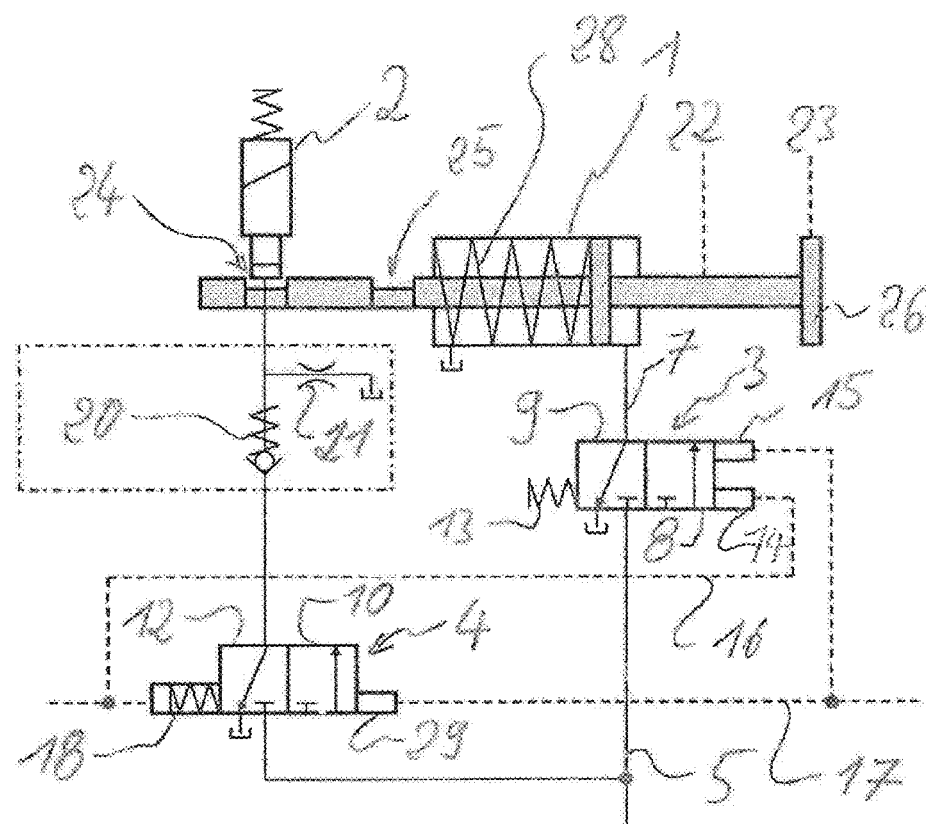
FIG. 5 shows a diagrammatic circuit diagram of a fifth embodiment of the invention.

FIG. 5 shows a further embodiment of the invention. Here, substantially the differences from the embodiments which have already been explained above will be described. The piston valve 3 is configured as a 3/2-way valve with two control pressure connectors 14, 15, as was already the case in the embodiment which was described in FIG. 1.

The control pressure connector 15 can be loaded with a hydraulic pressure from the actuation of a shifting element (not shown). The further control pressure connector 14 can be loaded via the hydraulic line 16 with a pressure from the actuation of the start-up element, and is connected in a fluid-conducting manner to one of the control pressure connectors on the locking valve 4.

Via the hydraulic line 16, the locking valve 4 can likewise be loaded with pressure via the spring device 18, with the same pressure as the control pressure connector 14, from the actuation of the start-up element (not shown). Furthermore, the piston valve 4 can be loaded via the control pressure connector 29 and the hydraulic line 17 with a hydraulic pressure from the actuation of the shifting element.

As a result of this type of construction, merely the pressure for actuating the start-up element (not shown) and a shifting element (not shown) is used to control the piston valve and the locking valve.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A parking brake system for a motor vehicle transmission, comprising:
   a piston lock;
   a brake cylinder having a brake piston movable between a braking position and a locking or releasing position;
   a piston valve in fluid communication with a supply pressure system on a side of the piston valve opposite a side in fluid communication with the brake cylinder, the piston valve being configured to control fluid flow from the supply pressure system to the brake cylinder to move the brake piston between the braking and locking or releasing positions; and
   a locking valve in fluid communication with the supply pressure system on a side of the locking valve opposite a side in fluid communication with piston lock, the locking valve being configured to control fluid flow from the supply pressure system to actuate the piston lock such that the piston lock locks the brake piston in the locking or releasing position,
   wherein the locking valve and the piston valve are mechanically separate from one another, and are arranged in parallel relative to the supply pressure system.

2. The parking brake system as claimed in claim 1, wherein
the piston valve is a directional valve having at least three valve connectors and at least two control positions, and
the locking valve is a directional valve having at least three valve connectors and at least two control positions.

3. The parking brake system as claimed in claim 2, wherein
the piston valve and the locking valve each have at least one control connector.

4. The parking brake system as claimed in claim 3, wherein
at least one of the at least one control connector of the piston valve is configured to be in fluid communication with at least one of the at least one control connector of the locking valve.

5. The parking brake system as claimed in claim 3, wherein
at least one of the at least one control connector of at least one of the locking valve and the piston valve is configured to be in fluid communication with a start-up pressure connector of a start-up element of the motor vehicle transmission.

6. The parking brake system as claimed in claim 5, wherein
at least one of the at least one control connector of at least one of the locking valve and the piston valve is configured to be in fluid communication with at least one shifting pressure connector of at least one shifting device of the motor vehicle transmission.

7. The parking brake system as claimed in claim 6, wherein
the locking valve is configured to be loaded with a locking valve spring actuating force by a locking valve prestress spring to move the locking valve into a first control position,
one of the at least one of the at least one control connector of the locking valve is one of the control connectors in fluid communication with the start-up pressure connector,
the locking valve is configured to be loaded via the one of the at least one of the control connector of the locking valve with a locking valve control pressure from the start-up pressure connector, such that a pressure actuating force resulting from the locking valve control pressure from the start-up pressure connector acts in the same direction as the locking valve spring actuating force, and
the locking valve is configured to be loaded with a second locking valve control pressure via another one of the at least one of the at least one control connector of the locking valve in fluid communication with the shifting pressure connector, such that a pressure actuating force resulting from the second locking valve control pressure from the shifting pressure connector acts in the opposite direction to the locking valve spring actuating force.

8. The parking brake system as claimed in claim 5, wherein
the piston valve is configured to be loaded with a piston valve spring actuating force by a piston valve prestress spring to move the piston valve into a first piston valve control position.

9. The parking brake system as claimed in claim 8, wherein
one of the at least one of the at least one control connector of the piston valve is one of the control connectors in fluid communication with the start-up pressure connector, and
the piston valve is configured to be loaded with a first piston valve control pressure via the one of the at least one of the at least one control connector of the piston valve from the start-up pressure connector, such that a pressure actuating force resulting from the first piston valve control pressure acts in the opposite direction to the piston valve spring actuating force.

10. The parking brake system as claimed in claim 9, wherein
the piston valve is configured to be loaded with a second piston valve control pressure via another one of the at least one of the at least one control connector of the piston valve in fluid communication with the at least one shifting pressure connector, such that a pressure actuating force resulting from the second piston valve control pressure from the shifting pressure connector acts in the opposite direction to the piston valve spring actuating force.

11. The parking brake system as claimed in claim 1, further comprising:
a shut-off valve arranged between the locking valve and the piston lock,
wherein
the shut-off valve is configured to prevent flow from the piston lock to the locking valve, and
the shut-off valve is configured to permit flow from the locking valve to the piston lock until a pressure between the locking valve and the shut-off valve is equal to or greater than a locking pressure threshold value.

12. The parking brake system as claimed in claim 11, further comprising:
a throttling valve arranged between the shut-off valve and the piston lock,
wherein
the throttling valve is configured to throttle flow from a fluid line between the shut-off valve and the piston lock to a tank return line.

13. A motor vehicle automatic transmission, comprising:
a parking brake system having
a piston lock;
a brake cylinder having a brake piston movable between a braking position and a locking or releasing position;
a piston valve in fluid communication with a supply pressure system on a side of the piston valve opposite a side in fluid communication with the brake cylinder, the piston valve being configured to control fluid flow from the supply pressure system to the brake cylinder move the brake piston between the braking and locking or releasing positions; and
a locking valve in fluid communication with the supply pressure system on a side of the locking valve opposite a side in fluid communication with piston lock, the locking valve being configured to control fluid flow from the supply pressure system to actuate the piston lock such that the piston lock locks the brake piston in the locking or releasing position,
wherein the locking valve and the piston valve are mechanically separate from one another, and are arranged in parallel relative to the supply pressure system.

14. A motor vehicle, comprising:
a transmission having a parking brake system, the parking brake system having
a piston lock;
a brake cylinder having a brake piston movable between a braking position and a locking or releasing position;
a piston valve in fluid communication with a supply pressure system on a side of the piston valve opposite a side in fluid communication with the brake cylinder, the piston valve being configured to control fluid flow from the supply pressure system to the brake cylinder move the brake piston between the braking and locking or releasing positions; and
a locking valve in fluid communication with the supply pressure system on a side of the locking valve opposite a side in fluid communication with piston lock, the locking valve being configured to control fluid flow from the supply pressure system to actuate the piston lock such that the piston lock locks the brake piston in the locking or releasing position,
wherein the locking valve and the piston valve are mechanically separate from one another, and are arranged in parallel relative to the supply pressure system.

* * * * *